United States Patent
Rachlin et al.

(10) Patent No.: US 10,089,090 B2
(45) Date of Patent: Oct. 2, 2018

(54) SYSTEM AND METHOD FOR FACILITATING DYNAMIC REMAPPING OF ABSOLUTE ADDRESSES DURING SOFTWARE MIGRATION

(71) Applicant: Honeywell International, Inc., Morris Plains, NJ (US)

(72) Inventors: Elliott Rachlin, Scottsdale, AZ (US); Ananthapadmanabha Krishnamurthy, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 220 days.

(21) Appl. No.: 15/176,108

(22) Filed: Jun. 7, 2016

(65) Prior Publication Data
US 2017/0351500 A1    Dec. 7, 2017

(51) Int. Cl.
G06F 9/44     (2018.01)
G06F 8/52     (2018.01)

(52) U.S. Cl.
CPC ...................... G06F 8/52 (2013.01)

(58) Field of Classification Search
CPC ................ G06F 8/51; G06F 8/52; G06F 8/41
USPC ......................................................... 717/136
See application file for complete search history.

(56) References Cited

U.S. PATENT DOCUMENTS 7,089,377 B1 *  8/2006  Chen .................. G06F 9/45537
                                                703/27
7,765,539 B1 *  7/2010  Elliott ....................... G06F 8/53
                                                717/145
2006/0069899 A1   3/2006  Schoinas et al.
2008/0306986 A1  12/2008  Doyle, Sr.
2009/0282089 A1  11/2009  Lakshmanachar et al.
2015/0278091 A1  10/2015  Wilkerson et al.

FOREIGN PATENT DOCUMENTS

WO     2015021331 A2    2/2015

OTHER PUBLICATIONS

Foreign Communication from Related Counterpart Application; PCT Patent Application No. PCT/US2017/034393; International Search Report and Written Opinion of the International Searching Authority dated Aug. 23, 2017; 11 pages.
Elliott Rachlin, "Apparatus and Method for Managing a Plurality of Threads in an Operating System," U.S. Appl. No. 14/622,465, filed Feb. 13, 2015, 31 pages.

(Continued)

*Primary Examiner* — Li B. Zhen
*Assistant Examiner* — Hui-Wen Lin
(74) *Attorney, Agent, or Firm* — Anthony Miologos (57) ABSTRACT

A method includes receiving at least one source code file associated with a legacy hardware platform, the at least one source code file being part of a software migration from the legacy hardware platform to a target hardware platform. The method also includes identifying one or more absolute memory addresses of the legacy hardware platform included in the at least one source code file. The method further includes for each of the one or more absolute memory addresses, including an address remapping function in an assembly language instruction block associated with the target hardware platform.

20 Claims, 6 Drawing Sheets

(56) References Cited

OTHER PUBLICATIONS

Elliott Rachlin, "System and Method for Endian Correction of Complex Data Structures in Heterogeneous Systems", U.S. Appl. No. 14/604,346, filed Jan. 23, 2015, 47 pages.
Elliott Rachlin, et al., "System and Method for Data Compatibility across Heterogeneous Machine Architectures", U.S. Appl. No. 15/164,724, filed May 25, 2016, 27 pages.
Elliott Rachlin, et al., "Relay Mechanism to Facilitate Processor Communication with Inaccessible Input/Output (I/0) Device", U.S. Appl. No. 15/017,422, filed Feb. 5, 2016, 31 pages.
Elliott Rachlin, System and Method for Preserving Value and Extending Life of Legacy Software in Face of Processor Unavailability, Rising Processor Costs, or other Issues, U.S. Appl. No. 15/017,467, filed Feb. 5, 2016, 34 pages.
Elliott Rachlin, "System and Method for Capturing and Displaying Packets and Other Messages in Local Control Network (LCN)", U.S. Appl. No. 15/009,544, filed Jan. 28, 2016, 2016, 23 pages.
Elliott Rachlin, et al., "Replication of Memory Image for Efficient Simultaneous Uses," U.S. Appl. No. 15/045,947, filed Feb. 17, 2016, 27 pages.
Ananthapadmanabha Krishnamurthy, et al., "System and Method for Legacy Level 1 Controller Virtualization," U.S. Appl. No. 15/045,947, filed Jun. 14, 2016.
"Packet analyzer," Wikipedia, Jan. 14, 2016, 4 pages.

* cited by examiner

MCT_Arr_Ptr := LOOPHOLE ($MCT_Arr_Ptr, MCT_Table_Start_020_040); ⎯302

00A8 287A FF5A      MOVEA.L    (L+4,PC),A4 ⎯304

```
003A  283A FFC8            MOVE.L    (L+4,PC),D4
003E  4844                 SWAP      D4
0040  61FF xxxx xxxx       BSR.L     P$128
                      XREF  P$128
0046  2844                 MOVEA.L   D4,A4
```
306

260

```
mov    eax,dword ptr [L+4]
mov    dword ptr [ebp+mem_map_d4_1],eax
rol    dword ptr [ebp+mem_map_d4_1],16
push   edx
push   dword ptr [ebp+mem_map_d4_1]
call   near ptr _P$128
lea    esp,[esp+4]
pop    edx
mov    dword ptr [ebp+mem_map_d4_1],eax
extrn  _P$128:
mov    edx,dword ptr [ebp+mem_map_d4_1]
```
308

FIG. 3

```
void * P$128 (void *ptr)
{
    // See if remapping table give other address.
    for (short int i=0;i<Address_Remapping_Table_Length;i++)
        if(ptr == Address_Remapping_Table[i].Old_Address)
            return Address_Remapping_Table[i].New_Address;
    // Else return NIL by default.
    return NIL;
}
```
402

```
Address remapping table:
typedef struct {
    char * Old_Address;
    char * New_Address;
} Address_Remapping_Table_Entry_Type;
```
404

```
Address_Remapping_Table_Entry_Type Address_Remapping_Table[] = {
    {(char *) 0x3FFFFFFF,   (char *) 0x7FFFFFFF},
    {(char *) 0x840B8,      (char *) &X840B8},
    {(char *) 0x84000,      (char *) 0},
    {(char *) 0x8280B,      (char *) &X8280B},
    {(char *) 0x82400,      (char *) &My_MCT},
    {(char *) 0x81E6C,      (char *) NIL},
    {(char *) 0x81CF0,      (char *) &X81CF0},
    {(char *) 0x81C30,      (char *) &X81C30},
    {(char *) 0x81C20,      (char *) &X81C20},
    {(char *) 0x81C0C,      (char *) &X81C0C},
    {(char *) 0x81C08,      (char *) &X81C08},
    {(char *) 0x81C04,      (char *) &X81C04},
    {(char *) 0x81C00,      (char *) &X81C00},
    {(char *) 0xBFDE,       (char *) NIL},
    {(char *) 0x400,        (char *) &My_MCT},
};
```
406

SYSTEM AND METHOD FOR FACILITATING DYNAMIC REMAPPING OF ABSOLUTE ADDRESSES DURING SOFTWARE MIGRATION

TECHNICAL FIELD

This disclosure relates generally to software migrations. More specifically, this disclosure relates to a system and method for facilitating dynamic remapping of absolute addresses during a software migration.

BACKGROUND

A software migration is a process of moving software from one hardware platform to another hardware platform. For example, a software migration may include moving a software application (and possibly associated data) from one computer system to another computer system. During a software migration, it is often the case that memory mapping differs between the systems. This is particularly true of hard-coded "absolute addresses" in memory, which often are different across dissimilar computer systems.

SUMMARY

This disclosure provides a system and method for facilitating dynamic remapping of absolute addresses during a software migration.

In a first embodiment, a method includes receiving at least one source code file associated with a legacy hardware platform, the at least one source code file being part of a software migration from the legacy hardware platform to a target hardware platform. The method also includes identifying one or more absolute memory addresses of the legacy hardware platform included in the at least one source code file. The method further includes for each of the one or more absolute memory addresses, including an address remapping function in an assembly language instruction block associated with the target hardware platform.

In a second embodiment, an apparatus includes at least one network interface and at least one processor. The at least one network interface is configured to receive and transmit data over at least one network. The at least one processing device is configured to receive at least one source code file associated with a legacy hardware platform, the at least one source code file being part of a software migration from the legacy hardware platform to a target hardware platform. The at least one processing device is also configured to identify one or more absolute memory addresses of the legacy hardware platform included in the at least one source code file. The at least one processing device is further configured to, for each of the one or more absolute memory addresses, include an address remapping function in an assembly language instruction block associated with the target hardware platform.

In a third embodiment, a non-transitory computer readable medium contains instructions that, when executed by at least one processing device, cause the at least one processing device to receive at least one source code file associated with a legacy hardware platform, the at least one source code file being part of a software migration from the legacy hardware platform to a target hardware platform. The medium also contains instructions that, when executed by the at least one processing device, cause the at least one processing device to identify one or more absolute memory addresses of the legacy hardware platform included in the at least one source code file. The medium further contains instructions that, when executed by the at least one processing device, cause the at least one processing device to for each of the one or more absolute memory addresses, include an address remapping function in an assembly language instruction block associated with the target hardware platform.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

During a software migration from one computer system to another, it is often the case that memory mapping differs between the systems. This is particularly true of hard-coded "absolute addresses" in memory, which often are different across dissimilar computer systems. Resolving these address differences across a very large code base can present a major challenge to the process of porting legacy software from one computer system to another.

To address these and other issues, embodiments of this disclosure provide a system and method for effectively handling the address remapping challenges without the need to modify any source code, thus achieving a potentially huge cost savings and an improvement in system reliability. The disclosed embodiments resolve absolute address mapping issues with very little manual effort. The disclosed embodiments are compatible with automated software migration tools, such as an assembly code translator that translates assembly code that is executable by one type of processor to assembly code that is executable by another type of processor. Such tools are readily available today; one example is the PortASM/68K translator product by MICROAPL LTD.

Figure 1:
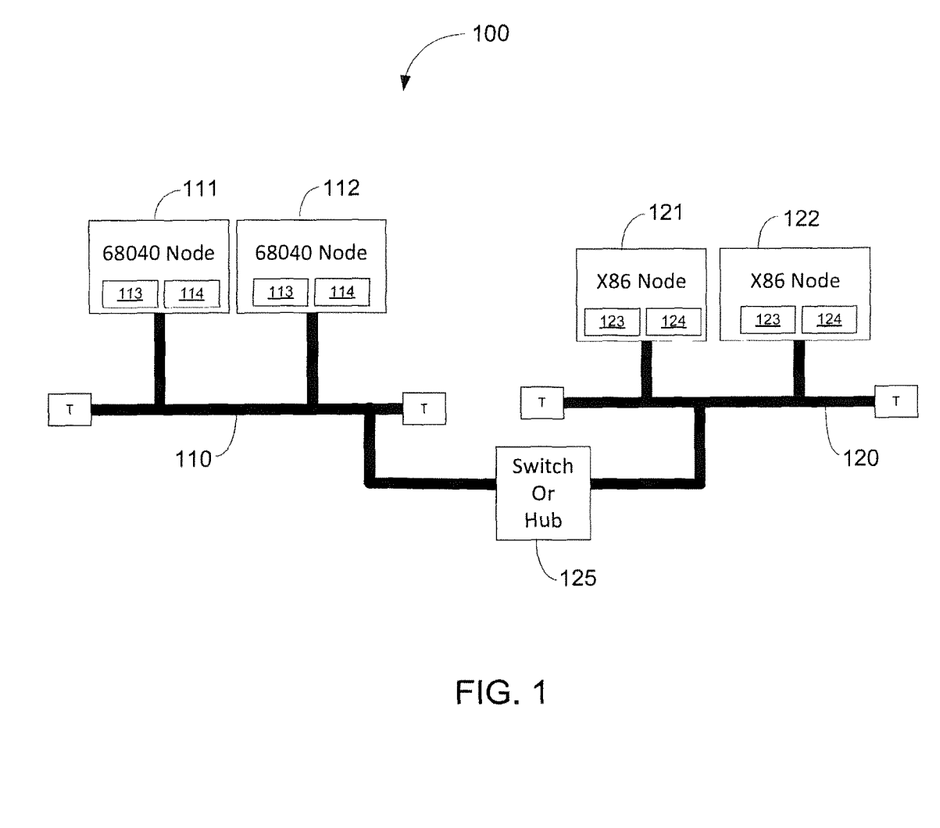
FIG. 1 illustrates an example system in which software migration can be performed according to this disclosure.

FIG. 1 illustrates an example system 100 in which software migration can be performed according to this disclosure. As shown in FIG. 1, the system 100 includes a first network 110 and a second network 120 that are coupled to a switch or hub 125. The network 110 includes a number of nodes, including nodes 111-112. Similarly, the network 120 includes a number of nodes, including nodes 121-122.

In this example embodiment, the system 100 can represent all or a portion of an industrial process control and automation system. For example, the nodes 111-112 can include one or more industrial process controllers configured to control process elements in a process or production system that may perform any of a wide variety of functions. As a particular example, the nodes 111-112 could be configured to provide control signals to process elements or equipment used to manufacture chemical, pharmaceutical, paper, or petrochemical products. Each node 111-112 includes any suitable structure for performing one or more functions in a process or production system. The nodes 111-112 could, for example, include one or more processing devices 113 and one or more memories 114 storing instructions and data used, collected, or generated by the processing device(s) 113. As particular examples, the processing devices 113 could include processors in the MOTOROLA 68040 processor family.

As another example, the nodes 121-122 can include one or more operator stations configured for user access and control of the process control and automation system. Each of the nodes 121-122 could, for example, include one or more processing devices 123 and one or more memories 124 storing instructions and data used, collected, or generated by the processing device(s) 123, such as software executed by the nodes 121-122. In particular embodiments, the nodes 121-122 could represent personal computers executing a MICROSOFT WINDOWS operating system, and the processing devices 123 could include processors in the INTEL x86 processor family.

The nodes 111-112 and 121-122 are coupled to each other and to other components of the system 100 through the networks 110-120. Each network 110-120 facilitates communication between various components in the system 100. Each network 110-120 represents any network or combination of networks facilitating communication between components in the system 100. For example, the network 110 could represent a controller network in a process control system, such as a coaxial cable network or Ethernet network. As another example, the network 120 could represent an Ethernet network.

In these embodiments, a software migration may be required between various ones of the nodes 111-112, 121-122. For example, an application or program that is currently executable on the nodes 111-112 may need to be migrated so that the application or program can be executed on the nodes 121-122. As another example, an application or program that is currently executable on the nodes 121-122 may need to be migrated so that the application or program can be executed on the nodes 111-112. These are examples of software migration between nodes having different machine architectures. As still another example, a software migration between nodes of the same machine architecture may be required, such as an application or program on the node 111 that is to be migrated to the node 112, or an application or program on the node 122 that is to be migrated to the node 121.

As explained above, different nodes (e.g., different computing devices) may have different memory maps, particularly with respect to "absolute addresses" (addresses that are hard-coded in executable instructions). For example, depending on machine architecture and configuration, each of the nodes 111-112, 121-122 may store certain variables, constants, or other data in different memory addresses or locations. As a particular example, a data constant 'MCT_Table_Start_020_040' may be stored at one memory address in the node 111 but stored in a different memory address in the node 121. Such differences are especially common between nodes of different machine architectures, such as the nodes 111 and 121. However, such differences can even occur between nodes of the same or similar machine architectures (e.g., the nodes 111 and 112). Thus, a software migration in which software is migrated or "ported" between different ones of the nodes 111-112, 121-122 may need to account for these differences.

To achieve this, the system 100 uses an address remapping technique that handles remapping challenges associated with memory addresses without the need to modify any source code and with very little manual effort. The address remapping technique uses a remapping function and a lookup table. The lookup table maps an absolute address on the legacy platform to the memory allocated on the new platform. The remapping function takes an absolute address as the input, uses the lookup table to determine the remapped address, and returns the remapped address as an output. Further details of the address remapping technique are provided below.

Although FIG. 1 illustrates one example of a system 100 in which software migration can be performed, various changes may be made to FIG. 1. For example, components could be added, omitted, combined, or placed in any other configuration according to particular needs. Also, while described as representing all or a portion of a process control and automation system, the system 100 could be used in any other manner. Further, the specific types of processors (68040 and x86) shown in FIG. 1 are examples only, and any other or additional type(s) of processor(s) could be used in each node. In addition, FIG. 1 illustrates one operational environment in which methods for facilitating dynamic remapping of absolute addresses during a software migration can be used. The software migration methods described here could be used in any other device or system.

Figure 2:
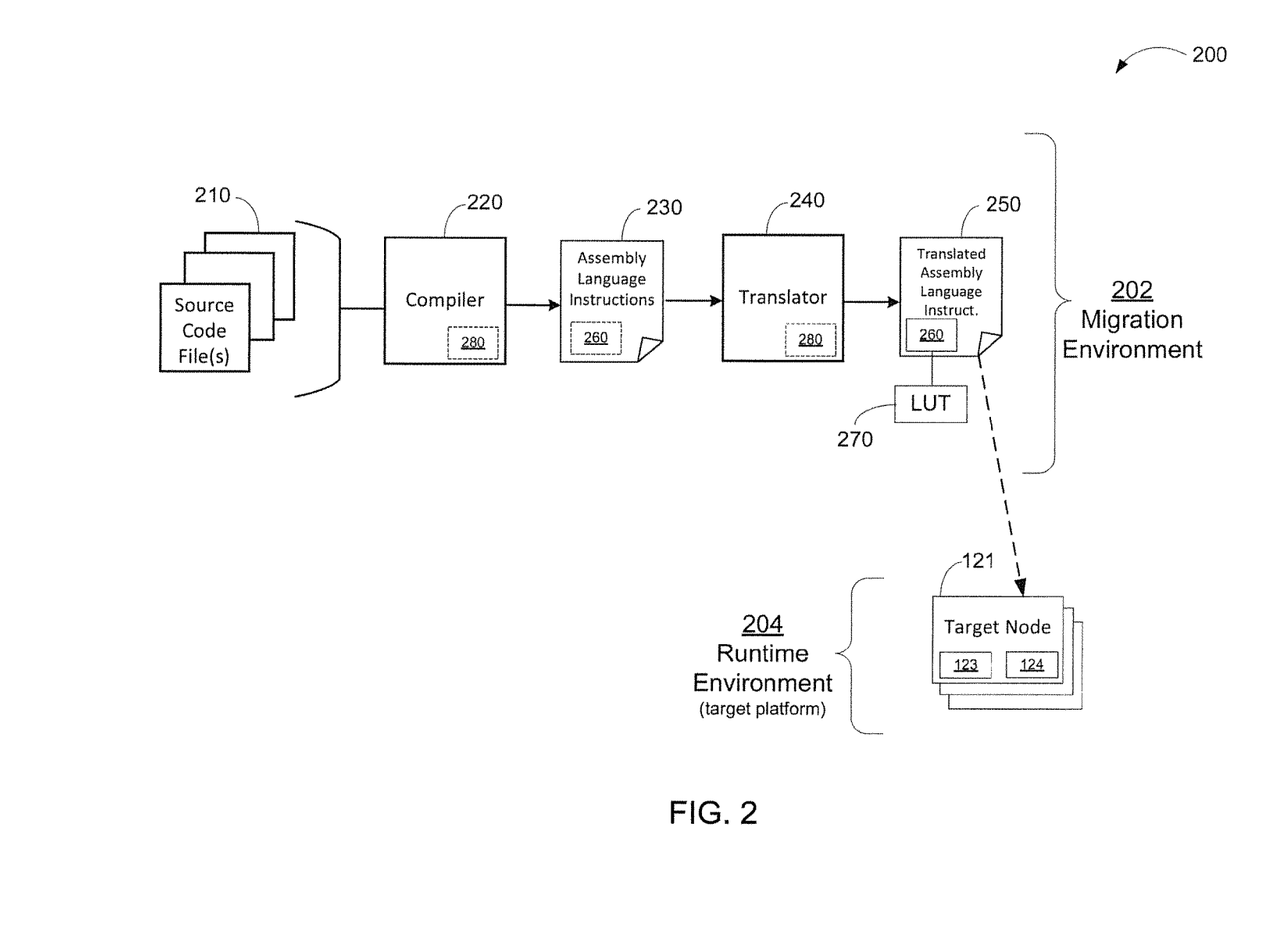
FIG. 2 illustrates an example system for facilitating dynamic remapping of absolute addresses during a software migration according to this disclosure.
Figure 3:
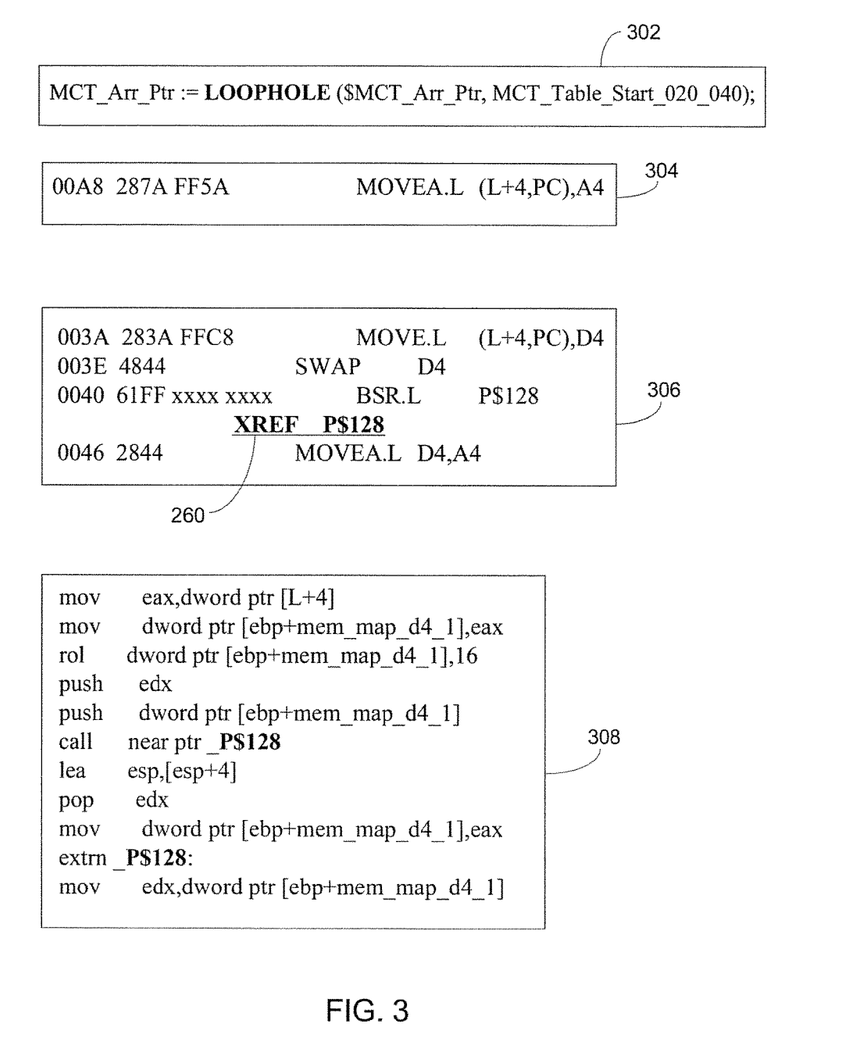
FIG. 3 illustrates a plurality of example code blocks that may be used in conjunction with the system of FIG. 2.

FIG. 2 illustrates an example system 200 for facilitating dynamic remapping of absolute addresses during a software migration according to this disclosure. FIG. 3 illustrates a plurality of code blocks that may be used in conjunction with the system 200 of FIG. 2. As shown in FIG. 2, the system 200 includes a migration environment 202 and a runtime environment 204. The runtime environment 204 can include or represent all or a portion of the components of the system 100 shown in FIG. 1 and described above.

In the migration environment 202, one or more source code files 210 are developed by a code developer, such as a programmer or engineer. The source code files 210 are written in a compilable, high-level programming language, such as Pascal or C. The code block 302 in FIG. 3 is an example instruction that is part of a source code file 210. In particular, the code block 302 is an instruction written in HONEYWELL Pascal for a software routine for a 68040 processor-based HONEYWELL Local Control Network (LCN). Each source code file 210 could include any suitable number of instructions in any suitable programming language.

A compiler 220 receives the source code file(s) 210 and compiles the instructions in each source code file 210 into machine-executable assembly language instructions 230. The code blocks 304-306 in FIG. 3 are examples of assembly language instructions that are generated by a compiler, such as the compiler 220, that compiles high-level programming language instructions, such as the Pascal code block 302. The assembly language instructions 230 are legacy assembly language instructions that are to be migrated to a target platform. For example, the assembly language instructions 230 could be assembly code that is executable by a 68040 processor (such as the code blocks 304-306) and is to be migrated to an x86 platform. As another example, the assembly language instructions 230 could be assembly code that is executable by an x86 processor and is to be migrated to a 68040 platform.

A translator 240 receives the assembly language instructions 230 that are compatible with a legacy platform and translates the assembly language instructions 230 to translated assembly language instructions 250 that are executable in the target platform. For example, the translator 240 can take the code blocks 304-306 in FIG. 3 and translate each block 304-306 into the code block 308. The code block 308 is an example of assembly code that is executable by an x86 processor and can represent translated assembly language instructions 250. The translator 240 can be a customized assembly language translator or can be an existing assembly code translator that is part of a software migration tool, such as PortASM/68K translator by MICROAPL LTD.

Once the translated assembly language instructions 250 are generated, the instructions 250 may be installed or otherwise loaded into one or more devices in the runtime environment 204. For example, the translated assembly language instructions 250 may be loaded into a memory 124 of the node 121 for execution by a processing device 123 in the node 121.

As discussed above, it may be necessary in a software migration to account for differences in memory addresses between a legacy platform and a target platform. The system 200 accounts for these differences with an address remapping technique that uses an address remapping function 260 and a lookup table 270. The lookup table 270 maps an absolute address on the legacy platform to a corresponding memory address allocated on the target platform. The address remapping function 260 is included as part of the translated assembly language instructions 250 that are executable in the runtime environment 204. The address remapping function 260 takes the absolute address from the legacy platform as an input, uses the lookup table 270 to determine the remapped address on the target platform, and returns the remapped address as an output. Whenever an absolute address assignment from the legacy code is encountered in the runtime environment, a call is made to the address remapping function 260, with the absolute address as the input to the function 260. The address remapping function 260 fetches the new address from the lookup table 270 and returns the new address.

The system 200 provides multiple options for incorporating the address remapping function 260 into translated assembly language instructions 250. In one embodiment, the compiler 220 includes a remap block 280 that inserts one or more calls to the address remapping function 260 to the assembly language instructions 230 as the compiler 220 compiles the source code file(s) 210. A typecasting operator included in the source code file(s) 210 can be used to detect the assignment of an absolute address to a pointer variable, as described below.

Turning again to FIG. 3, the code block 302 is a legacy Pascal instruction that assigns an absolute address contained in a constant "MCT_Table_Start_020_040" to the variable "MCT_Arr_Ptr." The code block 302 also includes a typecasting operator "LOOPHOLE" (shown in boldface). The LOOPHOLE operator is a customized Pascal operator that could be utilized as an indicator that a remap operation should be performed for the absolute address included as an operator argument (i.e., the address in "MCT_Table_Start_020_040"). As the compiler 220 compiles the source code file(s) 210, the compiler 220 encounters the LOOPHOLE operator in the code block 302. The LOOPHOLE operator triggers the remap block 280 in the compiler 220 to add the address remapping function 260 to the assembly language instructions 230.

For example, if the code block 302 did not include the LOOPHOLE operator (e.g., if the instruction was simply MCT_Arr_Ptr:=($MCT_Arr_Ptr, MCT_Table_Start_020_040);), then the compiler 220 would generate the compiled code block 304, which is the assembly code instruction for the code block 302 without the LOOPHOLE operator.

However, because the code block 302 includes the LOOPHOLE operator, the remap block 280 adds an address remapping function 260. For example, the compiled code block 306 includes additional instructions compared to the code block 304. In particular, the code block 304 includes a call to P$128, which is the name of the address remapping function 260. The trigger to add the extra lines of assembly code in the code block 306 (as compared to the code block 304) is the presence of the LOOPHOLE operator in the source code block 302. LOOPHOLE is an existing custom operator in Pascal that is typically used for casting purposes, but which is also leveraged here to trigger the address remapping function 260. While the LOOPHOLE operator is used in the example shown in FIG. 3, any other suitable operator (including a dedicated custom operator) could be used as long as it is recognizable by the address remapping function 260. Likewise, while the address remapping function 260 is called P$128 in FIG. 3, the address remapping function 260 could be given any suitable name or identifier in the code.

Once the address remapping function 260 has been added to the assembly language instructions 230, the translator 240 includes instructions associated with the address remapping function 260 in the translated assembly language instructions 250. For example, the code block 308, which represents the translated assembly language instructions 250, includes instructions associated with the P$128 remapping function (as indicated in boldface).

Later, in the runtime environment 204, whenever the code block 308 is executed by the target device (e.g., the node 121), the P$128 remapping function is performed, which causes a lookup in the lookup table 270 of the correct x86 memory address for MCT_Table_Start_020_040. The values in the lookup table 270 can be updated, e.g., by a system administrator, as needed. This is important because while the memory address stored in MCT_Table_Start_020_040 in the legacy 68040 device is constant, the corresponding memory address in the x86 device may not be constant. In fact, in some situations the memory mapped locations in the target device may need to be changed dynamically; this approach supports dynamically changing the remapping assignments.

As described above, in one embodiment, the compiler 220 includes the remap block 280. In another embodiment, the translator 240 (instead of the compiler 220) can include the remap block 280. That is, the translator 240 inserts the function call to the P$128 remapping function whenever an absolute address assignment is encountered in the source code file(s) 210. In this embodiment, the compiler 220 compiles the source code block 302 into the assembly language code block 304. Either the LOOPHOLE operator is not used in the code block 302 or the compiler 220 ignores the LOOPHOLE operator.

When the translator 240 receives the legacy assembly language code block 304, the translator 240 recognizes the absolute address assignment in the legacy assembly language code block 304. This triggers the remap block 280 in the translator 240 to add the P$128 address remapping function 260 to the code block 308, which is part of the translated assembly language instructions 250. Later, in the runtime environment 204, whenever the code block 308 is executed by the target device (e.g., the node 121), the P$128 remapping function is performed, as described above.

Although FIGS. 2 and 3 illustrate one example of a system 200 for facilitating dynamic remapping of absolute addresses during a software migration, various changes may be made to these figures. For example, various components in FIG. 2 could be combined, further subdivided, or omitted and additional components could be added according to particular needs. Also, while the source code block 302 is HONEYWELL Pascal code, the source code block 302 could be written in C or any other suitable programming language. Likewise, the disclosed remapping techniques can be used in conjunction with any suitable programming language. In general, software migration environments can come in a wide variety of configurations, and FIGS. 2 and 3 do not limit this disclosure to any particular configuration.

Figure 4:
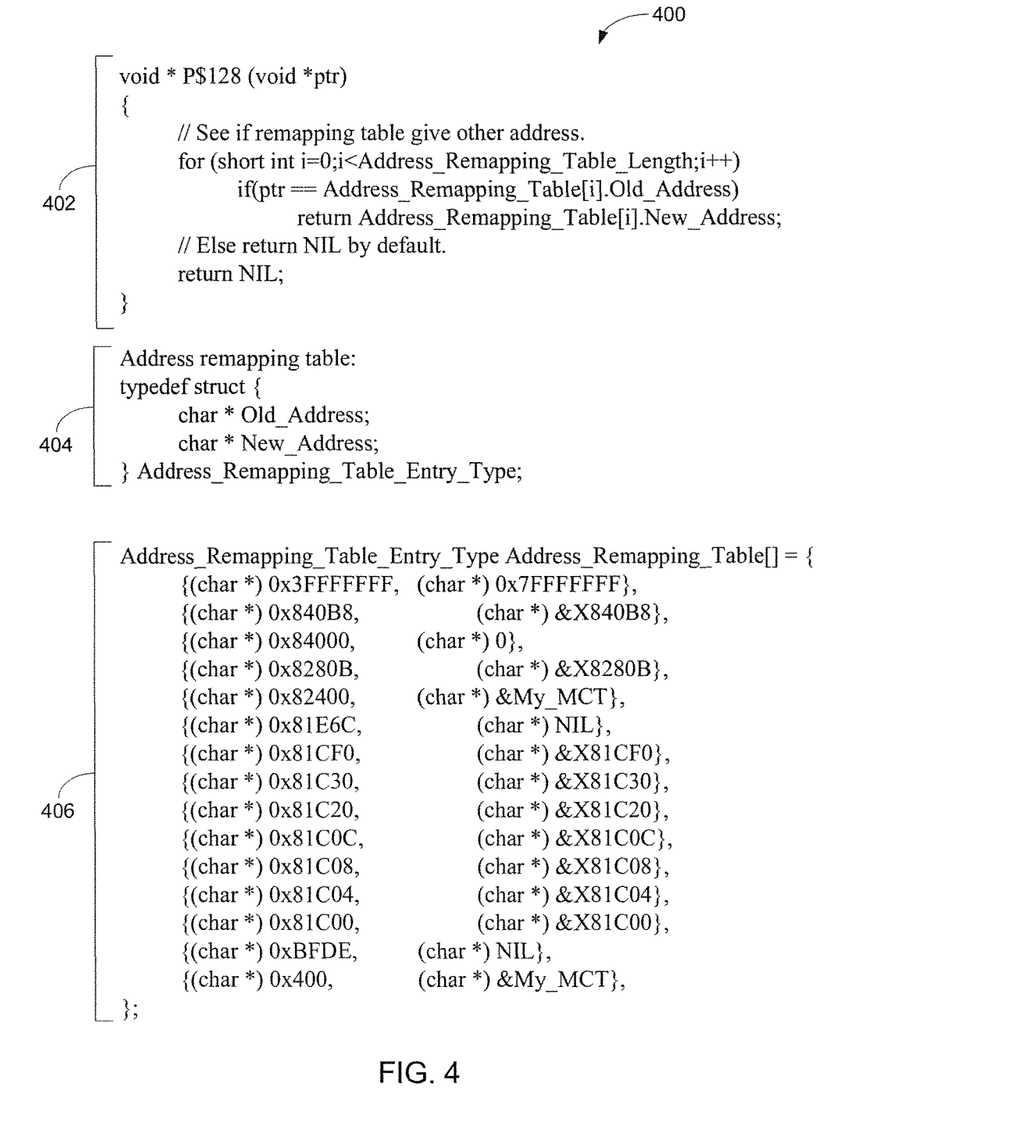
FIG. 4 illustrates an example code block that defines an address remapping function and a lookup table according to this disclosure.

FIG. 4 illustrates an example code block 400 that defines the address remapping function 260 and the lookup table 270 according to this disclosure. The code block 400 includes a first section 402 representing the instructions for the P$128 address remapping function 260, a second section 404 that defines the structure of the lookup table 270, and a third section 406 that populates the lookup table 270 with representative data values. As shown in FIG. 4, the code block 400 is written in C. However, this is merely one example. The code block 400 could be written in any suitable programming language. Also, the commands and data shown in the code block 400 is merely one representative example of how the address remapping function 260 and the lookup table 270 could be defined. Other embodiments of the address remapping function 260 and the lookup table 270 could be defined using other commands and data.

Figure 5:
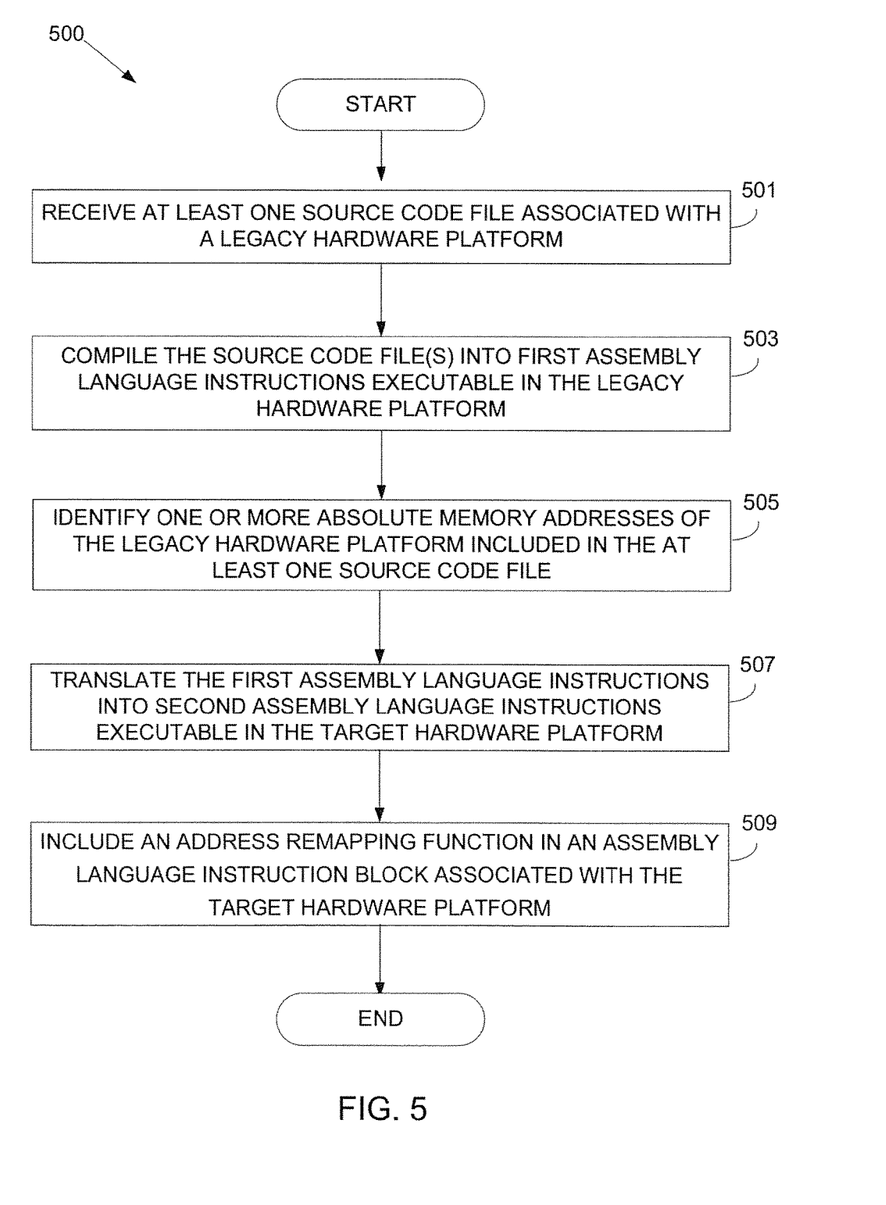
FIG. 5 illustrates an example method for facilitating dynamic remapping of absolute addresses during a software migration according to this disclosure.

FIG. 5 illustrates an example method 500 for facilitating dynamic remapping of absolute addresses during a software migration according to this disclosure. For ease of explanation, the method 500 is described as being performed using the system 200 of FIG. 2. However, the method 500 could be used with any suitable device or system.

At step 501, the system 200 receives at least one source code file associated with a legacy hardware platform. The at least one source code file is part of a software migration from the legacy hardware platform to a target hardware platform. This may include, for example, a compiler 220 receiving one or more source code files 210 that are part of a software migration from a 68040 hardware platform to an x86 hardware platform.

At step 503, the system 200 compiles the source code file(s) into first assembly language instructions executable in the legacy hardware platform. This may include, for example, the compiler 220 compiling the source code file(s) 210 into assembly language instructions 230.

During the compilation, at step 505, the system 200 may identify one or more absolute memory addresses of the legacy hardware platform included in the at least one source code file. This may include, for example, the compiler 220 identifying a typecasting operator in the source code file(s) 210 that includes the absolute memory address as an argument. As a particular example, the compiler 220 may identify a LOOPHOLE operator in one of the source code file(s) 210.

At step 507, the system 200 translates the first assembly language instructions into second assembly language instructions executable in the target hardware platform. This may include the translator 240 translating the assembly language instructions 230 into translated assembly language instructions 250.

At step 509, for each of the one or more absolute memory addresses identified in step 505, the system 200 includes an address remapping function in an assembly language instruction block associated with the target hardware platform. This may include, for example, the compiler 220 using a remap block 280 during the compiling operation to add instructions associated with the address remapping function P$128 to the assembly language instructions 230. Alternatively, this may include the translator 240 using the remap block 280 during the translating operation to add instructions associated with the address remapping function P$128 to the translated assembly language instructions 250.

Although FIG. 5 illustrates one example of a method 500 for facilitating dynamic remapping of absolute addresses during a software migration, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs. In addition, while the method 500 is described with respect to the system 200, which was described with respect to an industrial process control and automation system, the method 500 may be used in conjunction with other types of devices and systems.

Figure 6:
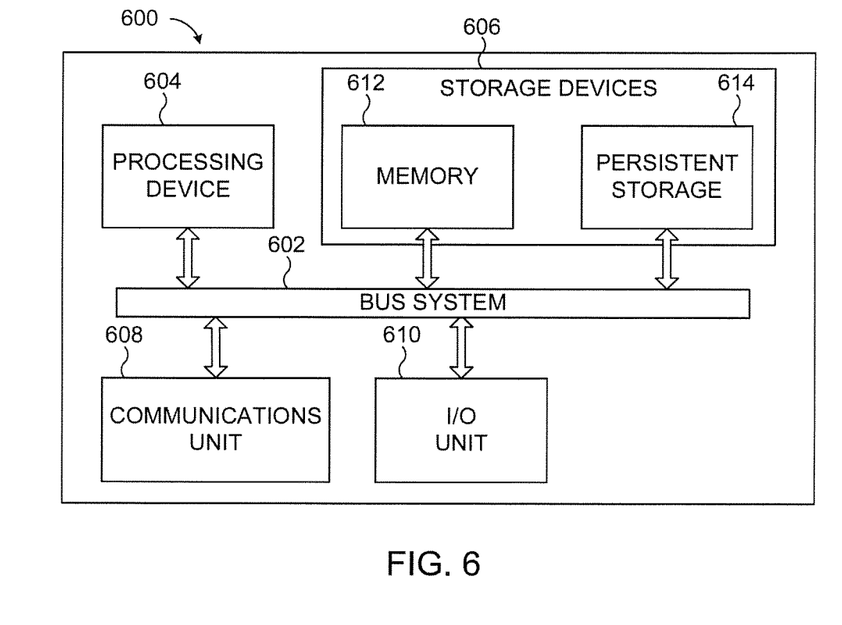
FIG. 6 illustrates an example device for facilitating dynamic remapping of absolute addresses during a software migration according to this disclosure.

FIG. 6 illustrates an example device 600 for facilitating dynamic remapping of absolute addresses during a software migration according to this disclosure. The device 600 could, for example, represent a computing device in the system 200 of FIG. 2, such as the compiler 220, the translator 240, or the target node 121. The device 600 could represent any other suitable device for facilitating dynamic remapping of absolute addresses during a software migration.

As shown in FIG. 6, the device 600 can include a bus system 602, which supports communication between at least one processing device 604, at least one storage device 606, at least one communications unit 608, and at least one input/output (I/O) unit 610. The processing device 604 executes instructions that may be loaded into a memory 612. The processing device 604 may include any suitable number(s) and type(s) of processors or other devices in any suitable arrangement. Example types of processing devices 604 include microprocessors, microcontrollers, digital signal processors, field programmable gate arrays, application specific integrated circuits, and discrete circuitry.

The memory 612 and a persistent storage 614 are examples of storage devices 606, which represent any structure(s) capable of storing and facilitating retrieval of information (such as data, program code, and/or other suitable information on a temporary or permanent basis). The memory 612 may represent a random access memory or any other suitable volatile or non-volatile storage device(s). The persistent storage 614 may contain one or more components or devices supporting longer-term storage of data, such as a ready only memory, hard drive, Flash memory, or optical disc. In accordance with this disclosure, the memory 612 and the persistent storage 614 may be configured to store instructions associated with facilitating dynamic remapping of absolute addresses during a software migration.

The communications unit 608 supports communications with other systems, devices, or networks, such as the networks 110-120. For example, the communications unit 608 could include a network interface that facilitates communications over at least one Ethernet network. The communications unit 608 could also include a wireless transceiver facilitating communications over at least one wireless network. The communications unit 608 may support communications through any suitable physical or wireless communication link(s).

The I/O unit 610 allows for input and output of data. For example, the I/O unit 610 may provide a connection for user input through a keyboard, mouse, keypad, touchscreen, or other suitable input device. The I/O unit 610 may also send output to a display, printer, or other suitable output device.

Although FIG. 6 illustrates one example of a device 600 for facilitating dynamic remapping of absolute addresses during a software migration, various changes may be made to FIG. 6. For example, various components in FIG. 6 could be combined, further subdivided, or omitted and additional components could be added according to particular needs. Also, computing devices can come in a wide variety of configurations, and FIG. 6 does not limit this disclosure to any particular configuration of device.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used, throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for software migration from a legacy hardware platform to a target hardware platform in an industrial process control and automation system comprising:
   receiving at least one source code file associated with the legacy hardware platform, the at least one source code file being part of the software migration from the legacy hardware platform to the target hardware platform;
   identifying one or more absolute memory addresses of the legacy hardware platform included in the at least one source code file;
   compiling the at least one source code file into first assembly language instructions executable in the legacy hardware platform;
   translating the first assembly language instructions into second assembly language instructions executable in the target hardware platform; and
   for each of the one or more absolute memory addresses, including an address remapping function in an assembly language instruction block associated with the target hardware platform;
   wherein each of the one or more absolute memory addresses of the legacy hardware platform is identified during the compiling by identifying a typecasting operator in the at least one source code file that includes the absolute memory address as an argument.

2. The method of claim 1, wherein the assembly language instruction block includes the first assembly language instructions, and the address remapping function is included in the first assembly language instructions during the compiling in response to identifying the typecasting operator.

3. The method of claim 1, wherein the assembly language instruction block includes the second assembly language instructions, and the address remapping function is included in the second assembly language instructions during the translating.

4. The method of claim 1, wherein the address remapping function includes instructions to determine from a lookup table a second memory address of the target hardware platform for each of the one or more absolute memory addresses of the legacy hardware platform.

5. The method of claim 1, wherein the at least one source code file is written in a high-level programming language.

6. The method of claim 1, wherein at least one of the legacy hardware platform or the target hardware platform includes a computing device in the industrial process control and automation system, the computing device comprising one of: a general-purpose computer or an industrial process controller.

7. The method of claim 1, wherein the at least one source code file comprises a Pascal or C source code file.

8. The method of claim 1, wherein the legacy hardware platform comprises a MOTOROLA 68040 hardware platform.

9. An apparatus for software migration from a legacy hardware platform to a target hardware platform in an industrial process control and automation system comprising:
at least one network interface configured to receive and transmit data over at least one network; and
at least one processor configured to:
receive at least one source code file associated with the legacy hardware platform, the at least one source code file being part of the software migration from the legacy hardware platform to the target hardware platform;
identify one or more absolute memory addresses of the legacy hardware platform included in the at least one source code file;
compile the at least one source code file into first assembly language instructions executable in the legacy hardware platform;
translate the first assembly language instructions into second assembly language instructions executable in the target hardware platform; and
for each of the one or more absolute memory addresses, include an address remapping function in an assembly language instruction block associated with the target hardware platform;
wherein the at least one processor is configured to identify each of the one or more absolute memory addresses of the legacy hardware platform during the compiling by identifying a typecasting operator in the at least one source code file that includes the absolute memory address as an argument.

10. The apparatus of claim 9, wherein the assembly language instruction block includes the first assembly language instructions, and the at least one processor is configured to include the address remapping function in the first assembly language instructions during the compiling in response to identifying the typecasting operator.

11. The apparatus of claim 9, wherein the assembly language instruction block includes the second assembly language instructions, and the at least one processor is configured to include the address remapping function in the second assembly language instructions during the translating.

12. The apparatus of claim 9, wherein the address remapping function includes instructions to determine from a lookup table a second memory address of the target hardware platform for each of the one or more absolute memory addresses of the legacy hardware platform.

13. The apparatus of claim 9, wherein the at least one source code file is written in a high-level programming language.

14. The apparatus of claim 9, wherein the at least one source code file comprises a Pascal or C source code file.

15. The apparatus of claim 9, wherein the legacy hardware platform comprises a MOTOROLA 68040 hardware platform.

16. A non-transitory computer readable medium containing instructions that, when executed by at least one processing device for software migration from a legacy hardware platform to a target hardware platform in an industrial process control and automation system, cause the at least one processing device to:
receive at least one source code file associated with the legacy hardware platform, the at least one source code file being part of the software migration from the legacy hardware platform to the target hardware platform;
identify one or more absolute memory addresses of the legacy hardware platform included in the at least one source code file;
compile the at least one source code file into first assembly language instructions executable in the legacy hardware platform;
translate the first assembly language instructions into second assembly language instructions executable in the target hardware platform; and
for each of the one or more absolute memory addresses, include an address remapping function in an assembly language instruction block associated with the target hardware platform;
wherein the instructions when executed cause the at least one processing device to identify each of the one or more absolute memory addresses of the legacy hardware platform during the compiling by identifying a typecasting operator in the at least one source code file that includes the absolute memory address as an argument.

17. The non-transitory computer readable medium of claim 16, wherein the assembly language instruction block includes the first assembly language instructions, and the instructions when executed cause the at least one processing device to include the address remapping function in the first assembly language instructions during the compiling in response to identifying the typecasting operator.

18. The non-transitory computer readable medium of claim 16, wherein the assembly language instruction block includes the second assembly language instructions, and the instructions when executed cause the at least one processing device to include the address remapping function in the second assembly language instructions during the translating.

19. The non-transitory computer readable medium of claim 16, wherein the at least one source code file comprises a Pascal or C source code file.

20. The non-transitory computer readable medium of claim 16, wherein the legacy hardware platform comprises a MOTOROLA 68040 hardware platform.

* * * * *